May 24, 1932. P. B. L'HOMMEDIEU 1,860,255
BUDDING AND GRAFTING TAPE
Filed April 22, 1929

Inventor
P. B. L'HOMMEDIEU,
By Jas. A. Richmond
Attorney

Patented May 24, 1932

1,860,255

UNITED STATES PATENT OFFICE

PAIGE B. L'HOMMEDIEU, OF NEW BRUNSWICK, NEW JERSEY, ASSIGNOR TO JOHNSON & JOHNSON, OF NEW BRUNSWICK, NEW JERSEY, A CORPORATION OF NEW JERSEY

BUDDING AND GRAFTING TAPE

Application filed April 22, 1929. Serial No. 357,319.

The invention is addressed to grafting, budding and other problems of the nurseryman.

There has been a manifest failure of materials heretofore proposed to meet nursery requirements. Fall budding requires bud protection over a long period against weather which is violent in its deteriorating effect and during which there is no stock expansion to be provided for. On the other hand, in spring, budding expansion is immediate and the deteriorating weather comparatively mild. Yet, the wrapper of the old practice is rapidly deteriorated in the fall and prolonged in the spring,—the reverse of the actual requirements.

The desideratum is to provide grafting and budding tape in form convenient for facile application; which shall be sun-proof, moisture and weatherproof, and proof against insects, vermin or infection; which shall be capable of promoting cell growth and healing and of affording a firm support for the part of the plant to which it is applied; which shall comprise a band or foundation cloth that is close woven, flexible and non-absorbent, and a gum spread of pure vegetable origin and comparatively thin and so constituted that adhesion is immediate and complete on plant bark as soon as applied, and withal having the adhesive property so tempered that adhesion although instant and permanent is yet of such nature as to enable easy pulling off without injury to the most tender bark; which shall possess all of the essentials required in the transferring and sealing of the bud with due regard to minimum exposure of the cambiums to air and to the maintenance of constant and uniform pressure so as to insure perfect contact of the two cambium layers and non-disturbance of the bud patch on the stock during the period of adhesion of the two cambiums; to provide an all vegetable gum tape possessed of health giving properties and all of the attributes recited and which will permit slippage in response to stock expansion in such compensatory way as not to impair the original seal, nor disturb the original pressure; and to provide industrial tape of the nature stated that is economical in that it provides a complete wrapper which obviates the use of the customary adjuncts, such as wax cloth and other shelters.

The nature, characteristic features and scope of the invention will be more readily understood from the following description taken in connection with the accompanying drawings, forming a part hereof, wherein Figure 1 shows a roll of industrial tape embodying the invention.

Figure 1:
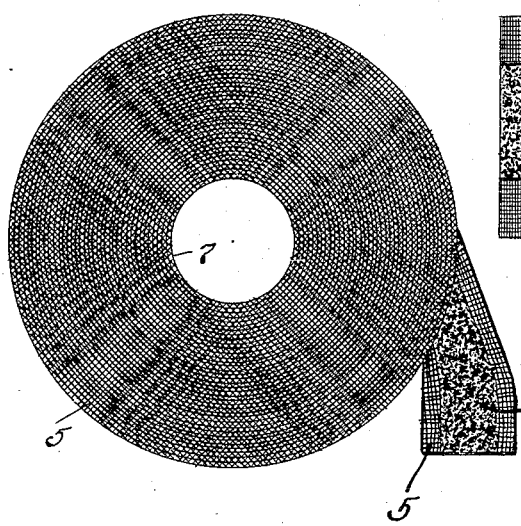
Figure 2:
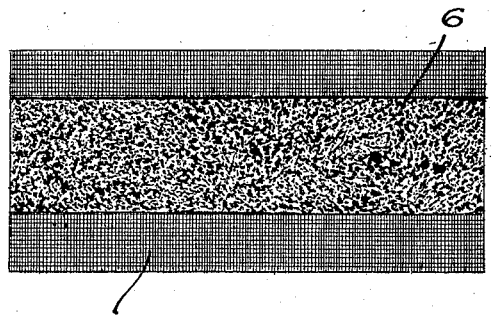
Fig. 2 is a more or less diagrammatical view to indicate the close woven characteristic of the foundation fabric is contrast with the open weave of ordinary cloth.
Figure 3:
Fig. 3 is an edge view of a section of the improved tape.

According to the invention, the improved tape comprises close woven muslin or other fabric 5, having inherent resiliency and little or no absorbent quality, and having an adhesive surface 6. A roll of tape is shown in Fig. 1, and it has a hollow core or center 7 so that it may be slung on a string carried over the shoulder or attached to a suspender strap in order that both hands will be free to carry on in the nursery work.

The adhesive or gum spread should be of such nature that while consistently thin, it will be airtight and possessed of plant wound healing properties, and it must respond to slitting so as to compensate for stock expansion without disturbing the bud wrapping. Hence, the invention contemplates a weatherproof, moisture proof, vermin proof adhesive spread or coating possessed of the attributes stated, and derived from vegetable sources. A composition that has proved markedly efficient consists of gum elastica combined with resins from *Picea excelsa*, *Pinus australis*, gum olibanum, and wax. The addition of orris or other vegetable filler gives the compound the desired firmness and consistency.

In preparing a batch of the composition I blend the following ingredients in substantially the proportions stated, gum elastica, 30%, resin from *Picea excelsa*, 15%, resin from *Pinus australis*, 15%, gum olibanum, 10%, wax, 5%, the remainder being principally a vegetable filler such as, for example, powdered orris root, and, if desired, an element such as carbolic acid or salicylic acid to enhance the antiseptic or germ destroying properties of the mass.

The composition may be varied as to some of the components and as to the plasticity of its mass to suit particular conditions. Manifestly, the described spread is adhesively effective without the application of heat; is immune to heat or cold; is aseptically clean; and is sun-proof, storm-proof and vermin-proof. And there is the desired coordination between the gum spread and the fabric foundation to insure equal pressure over all parts of the bud-patch so that sap circulation will be free and unrestricted a condition not heretofore attainable with the makeshift provisions at the disposal of the nurseryman, so that there was the ever present menace of choking circulation; and with most of such materials no part of the wrapper is complete until the last knot is tied or the last wrap made. With the tape of the instant case a complete wrapper is provided as it is progressively applied.

One of the most serious and annoying problems of the plant propagator is to provide for normal stock expansion even though he may know the cambium adhesion is not completed. If the ordinary wrapper is left intact, in order not to disturb the bud, circulation is constricted. If the wrapper is cut to allow expansion the pressure on the bud is released suddenly and he can only hope that it will shift for itself. This opposing situation undoubtedly is the direct cause of more bud losses than any other single factor.

Figure 4:
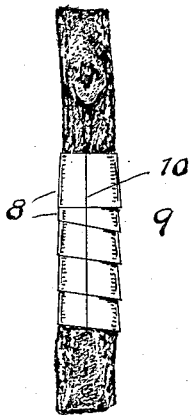
Figs. 4, 5 and 6 are illustrative of how the new tape adapts itself to service in budding operations.
Figure 5:
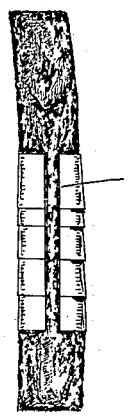
Figure 6:

Figs. 4, 5 and 6 illustrate how the problem is solved. After a number of spiral turns 8 have been made to form the wrapper 9, the latter is slit, as at 10. Under such condition the normal swelling of the stock causes the ends 11 to pull apart, and the slightly viscous gum spread admits of this through slippage along the bark without disturbance of the seal and without alteration of the original pressure on the bud, and no matter how quickly or slowly the stock expands the compensation of the wrapper is directly proportional. It will be noted that the only change in the original wrapper is the gradual widening of the gap between the cut ends and this in no way alters the relative arrangement of the bud and wrapper. The seal remains intact during stock expansion because the tape does not leave the bark but merely slips along it due to the character of the adhesive and that of the backing.

If necessary or expedient the backing or foundation fabric may be treated to insure non-absorptive properties by impregnating or filling it in any approved manner.

It is characteristic of the new product that it forms an impermeable covering to the plant tissue to which it may be applied, thus acting as a support and a protection against injury and infection of the tissues which it covers. The mass is plastic, elastic and adhesive at all temperatures and has a flow by which it is brought into close contact with each cell of the plant tissue, thus carrying to each individual cell antiseptic and healing properties of the ingredients of the mass. The resins from the *Picea excelsa*, the *Pinus australis* and gum olibanum carry adhesive properties; they likewise contain certain resins and turpentine products which are antiseptic, stimulating to the plant tissues, and which become healing to the tissues to which they are applied.

Having described my invention, I claim:

1. Sealing tape for budding and grafting purposes, comprising non-absorbent, close woven, flexible fabric, and a moisture and weatherproof, thin, viscous, pressure sensitive gum spread having healing and germicidal properties and embodying gum elastica combined with resins from *Picea excelsa*, *Pinus australis*, gum olibanum and wax, whereby the spread has a normal flow to convey said healing and germicidal bodies into intimate contact with individual cells.

2. Sealing tape for budding and grafting purposes, comprising a fabric vehicle carrying a mass that is plastic, elastic and adhesive at all temperatures and which permits slippage without loss of anchorage in response to stock expansion, said mass having in association extractive matter of vegetable origin having antiseptic and healing properties, and a vegetable filler, the mass having a normal flow whereby its antiseptic and stimulating or healing agents are brought into close contact with individual cells of the plant tissue.

In testimony whereof I affix my signature.

PAIGE B. L'HOMMEDIEU.